Patented Nov. 21, 1950

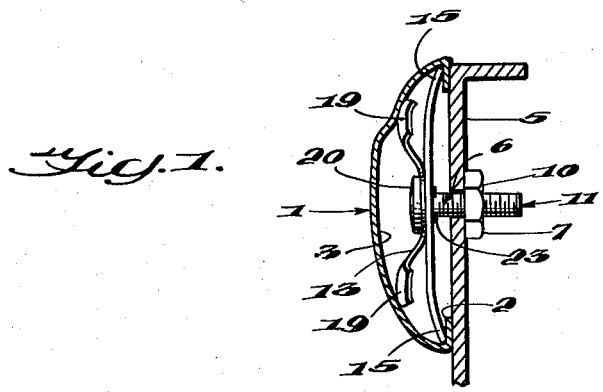
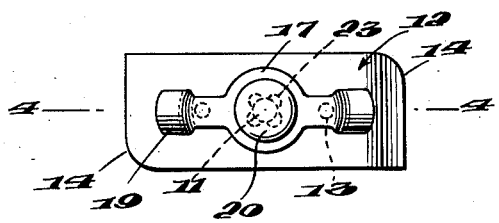
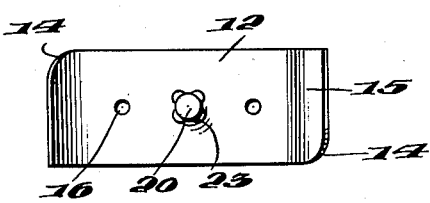
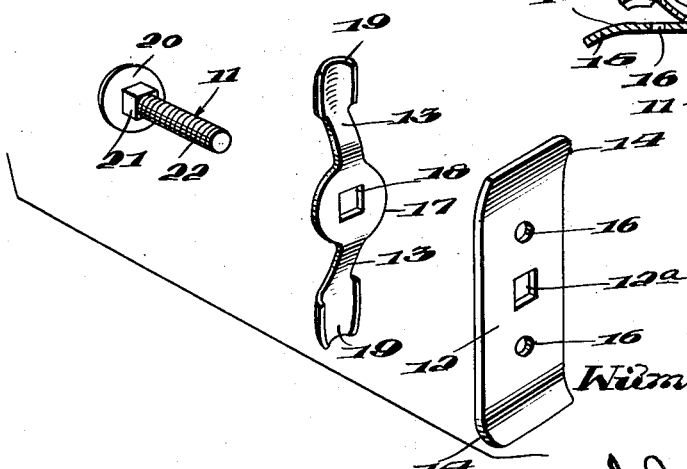

2,531,351

UNITED STATES PATENT OFFICE 2,531,351

T-HEAD MOLDING FASTENER WITH TENSIONING MEMBER

Wilmer H. Churchill, Saugus, Mass., assignor to United-Carr Fastener Corporation, Cambridge, Mass., a corporation of Massachusetts Application October 8, 1946, Serial No. 701,870

6 Claims. (Cl. 24—73)

The present invention relates to fasteners and more particularly to fasteners for attaching moldings and similar hollow channelled parts to motor vehicle bodies or other suitable supports.

One of the primary objects of the invention is the provision of a simplified fastener which may be preassembled within a hollow molding or like channelled part preparatory to attaching the part and fastener to a support.

A further object of the invention is the provision of an improved fastener combining a T-member and a tensioning member permitting the slidable positioning of the fastener in a molding and the subsequent clamping of the molding to a support.

Other aims and objects of the invention will be apparent to those skilled in the art from a consideration of the accompanying drawings and annexed specification illustrating and describing one preferred embodiment of the invention.

In the drawings

Fig. 1 is a transverse sectional view of a molding strip secured to a supporting member by means of a fastener constructed in accordance with a preferred form of the invention;

Fig. 2 is a top plan view of the fastener shown in Fig. 1;

Fig. 3 is a bottom plan view of the fastener shown in Figs. 1 and 2;

Fig. 4 is a longitudinal sectional view of the fastener as taken on the line 4—4 of Fig. 2; and Fig. 5 is a perspective view of the component parts of the fastener in disassembled relation.

Referring to the drawings the reference numeral 1 designates a molding or like hollow part, which is to be secured to a suitable support 5, which may be a part of the runningboard of a motor vehicle and which may be provided with a series of apertures 6 for the reception of a part of the fastener as is more fully described hereinafter. The molding 1 may be of any suitable cross sectional shape and conveniently is of hollow channelled construction, being provided with spaced inwardly directed flanges 2 disposed substantially in a common plane spaced laterally from the face 3 of the molding.

A preferred embodiment of the fastener comprises a T-member 10 having an attaching shank 11, a flange-gripping crosshead 12 disposed in a plane normal to the shank and an associated tensioning member 13 secured thereto so as to be turnable as a unit about the axis of the shank. The fastener is adapted to be turned to a position at right angles to the chanel presented by the spaced flanges 2, and in such position the crosshead 12 will engage and bear against the inner faces of the flanges 2 and the tensioning member 13 will engage and bear against the inner wall of the face 3 of the molding.

The crosshead 12 may be substantially rectangular as shown, with a central shank-receiving aperture 12ª and diagonally opposite rounded corners 14 and the ends may be turned outwardly as at 15, to provide contact-bearing surfaces for engagement with the molding flanges 2. The crosshead may also be provided with spaced apertures 16 to receive a spanner wrench or like tool by means of which it may be rotated about the axis of the shank 11.

The tensioning member 13 conveniently may be formed of resilient sheet material, for example spring sheet metal, and advantageously is of a length less than the length of the crosshead 12. Conveniently, it may comprise an elongated strip having a central hub portion 17 apertured as at 18 to receive the shank 11, and opposed outwardly extending terminal cams 19 disposed in a plane spaced from the plane of the hub 17. The cams 19 may be readily formed by transversely curving the terminal ends of the member 13 so as to present transversely arcuate surfaces for sliding bearing engagement with the irregular inner wall of the face 3 of the molding 1.

The crosshead 12 and tensioning member 13 may be interconnected for unitary turning by any suitable means. As herein disclosed, the shank 11 is provided with a head 20, a squared portion 21 adjacent the head and a threaded nut-receiving portion 22. The shank-receiving apertures 12ª and 18 of the crosshead 12 and tensioning member 13 may be square to receive the squared shank portion 21, a portion of which may be upset over the crosshead as at 23, to secure the parts in assembled relationship. By reason of this construction, the tensioning member will be turned with the crosshead 12 and always remains in superposed relation thereto.

In use, the fastener is inserted within a molding with the crosshead 12 and tensioning member between and substantially parallel to the flanges 2 and positioned in a desired location in the molding. The crosshead 12 and tensioning member 13 may then be turned 90 degrees by means of a spanner wrench or like tool engaging the apertures 16 to force the ends 15 of the crosshead into bearing engagement with the inner faces of the flanges 2 and the cam ends 19 of the tensioning member into engagement with opposed inner walls of the face 3 of the molding. The fastener is thus preliminarily positioned within the molding ready for attachment to a support as by inserting the threaded shank 11 of the T-member through an aperture in the support.

The position of the fastener along the molding may be adjusted by applying pressure to the crosshead 12 and then moving the fastener along the molding channel to the desired position.

The assembled molding and fastener may be secured to the support 5 by means of a nut or like element 7 engaging the threaded shank 11 passed through the aperture 6 of the support. Tightening the nut 7 upon the shank 11 increases the clamping pressure between the crosshead 12 and flanges 2 so that the molding flanges 2 are securely clamped between the crosshead 12 and the support 5.

Although I have illustrated and described one preferred form of my invention, I do not wish to be limited thereby as the scope of the invention is best defined by the appended claims.

I claim:

1. A fastener member comprising a shank having a squared portion and a threaded nut-receiving portion, an elongated plate non-rotatably secured to said squared portion and provided with molding-engaging portions at opposite ends thereof for engaging the inner surfaces of a molding, and an elongated resilient thrust member non-rotatably secured to said squared portion and having contact portions spaced from the plane of said plate, said plate and thrust member being turnable as a unit about the axis of the shank.

2. A fastener member comprising a support-engaging shank having a squared portion and a threaded nut-receiving portion, an elongated plate non-rotatably secured to said squared portion, and an elongated thrust member non-rotatably secured to said shank and having resiliently supported transversely arcuate contact portions at the terminal ends thereof spaced from the plane of said plate, said plate and thrust member being turnable as a unit about the axis of the shank.

3. A fastener member comprising an attaching shank having a squared portion and a threaded nut-receiving portion, an elongated plate non-rotatably mounted on said squared portion, and an elongated thrust member of less length than said plate member non-rotatably secured to said shank and having oppositely disposed tensioning portions spaced from the plane of said plate, said plate and thrust member being turnable as a unit about the axis of the shank.

4. A T-shaped molding fastener comprising an attaching member having a flanged head portion adjacent one end thereof, a cross member non-rotatably mounted on said attaching member adjacent said head portion, said cross member comprising a plate member and a resilient thrust member, said resilient thrust member being mounted between said head portion and plate member and having opposed resilient arms extending angularly outward with respect to said plate member and provided with curved terminal contact portions spaced therefrom.

5. A molding fastener comprising an attaching member having a flanged head portion and a support-engaging portion, a cross member non-rotatably mounted on said attaching member, said cross member comprising an elongated plate member disposed in a plane substantially normal to the axis of said attaching member and provided with molding-engaging portions at opposite ends for engaging a pair of spaced portions of the inner surfaces of a molding, and a resilient thrust member having a substantially greater flexibility than said plate member mounted on said attaching member and having a terminal contact portion spaced from said plate member for tensioned engagement with a third spaced portion of the inner surface of such a molding to tension said molding-engaging portions against said pair of spaced portions of the inner surface of such a molding, whereby the fastener member is secured to a molding by the tension of its parts against spaced portions of the inner surface of the molding.

6. A molding fastener comprising an attaching member having a flanged head portion and a support-engaging portion, a cross member non-rotatably mounted on said attaching member, said cross member comprising an elongated plate member disposed in a plane substantially normal to the axis of said attaching member and provided with molding-engaging portions at opposite ends for engaging a pair of spaced portions of the inner surfaces of a molding, and a resilient thrust member non-rotatably mounted on said attaching member, said thrust member having oppositely disposed tensioning portions aligned with said plate member and spaced from the plane thereof for tensioned engagement with the inner surfaces of a molding.

WILMER H. CHURCHILL.

REFERENCES CITED

The following references are of record in the file of this patent:

UNITED STATES PATENTS

| Number | Name | Date |
|---|---|---|
| 2,105,706 | Stamy | Jan. 18, 1938 |
| 2,148,847 | Wiley | Feb. 28, 1939 |
| 2,156,669 | Van Uum | May 2, 1939 |
| 2,180,925 | Dyresen | Nov. 21, 1939 |
| 2,198,186 | Tinnerman | Apr. 23, 1940 |
| 2,216,219 | Wiley | Oct. 1, 1940 |
| 2,278,627 | Wernig | Apr. 7, 1942 |
| 2,473,400 | Waara | June 14, 1949 |